United States Patent
Takahashi et al.

[11] Patent Number: 5,879,755
[45] Date of Patent: Mar. 9, 1999

[54] POWDER COATING, POWDER COATING PROCESS AND POWDER-COATED ARTICLE

[75] Inventors: Masayuki Takahashi; Michiei Nakamura; Katsuhiko Yamada; Takayoshi Hirata, all of Tokyo, Japan

[73] Assignee: Dainichiseika Color & Chemicals Mfg. Co., Ltd., Tokyo, Japan

[21] Appl. No.: 914,816

[22] Filed: Aug. 20, 1997

[30] Foreign Application Priority Data

Sep. 2, 1996 [JP] Japan ..................... 8-248531

[51] Int. Cl.⁶ .................. B05D 1/06; B01J 8/24
[52] U.S. Cl. .............. 427/475; 427/459; 427/469; 427/485; 427/185; 427/201
[58] Field of Search .................. 427/459, 469, 427/475, 485, 185, 201; 118/625, 638; 428/147; 106/20 R, 23 C, 22 C, 38.6

[56] References Cited

U.S. PATENT DOCUMENTS

| | | | |
|---|---|---|---|
| 3,786,309 | 1/1974 | Miottel | 317/3 |
| 3,980,732 | 9/1976 | Isaksen et al. | 260/850 |
| 4,013,615 | 3/1977 | Ohashi et al. | 260/42.53 |
| 4,170,074 | 10/1979 | Heckman et al. | 34/57 A |
| 4,265,929 | 5/1981 | Wagner et al. | 427/33 |
| 4,278,483 | 7/1981 | Mansolillo | 156/79 |
| 4,371,638 | 2/1983 | Bernelin et al. | 523/427 |
| 4,923,657 | 5/1990 | Gembinski et al. | 264/73 |
| 5,328,736 | 7/1994 | Charles et al. | 427/459 |
| 5,518,546 | 5/1996 | Williams et al. | 118/621 |

*Primary Examiner*—Shrive Beck
*Assistant Examiner*—Michael Barr
*Attorney, Agent, or Firm*—Oblon, Spivak, McClelland, Maier & Neustadt, P.C.

[57] ABSTRACT

Provision of two or more powder coatings different in hue, lightness and/or saturation as base colors makes it possible to mix the base color powder coatings in accordance with a desired color and hence to conduct color matching upon performing powder coating. It is therefore no longer necessary to stock a large number of powder coatings, in other words, it is therefore possible to systematically produce fewer powder coatings in greater quantities. This can achieve rationalization in production, storage, physical distribution, management and the like and also a cost reduction in each of these stages. For example, coatings of desired color tones, especially coatings excellent in artistry can be formed in accordance with a fluidized-bed, electrostatic coating process making use of a powder-fluidizing container by preparing in advance only three primary colors of yellow, red and blue or optionally five primary colors additionally including black color and white color. The present invention provides these powder coatings, powder coating process and powder-coated article.

8 Claims, 1 Drawing Sheet

POWDER COATING, POWDER COATING PROCESS AND POWDER-COATED ARTICLE

BACKGROUND OF THE INVENTION a) Field of the Invention

This invention relates to a powder coating, a powder coating process and a powder-coated article, and more specifically to a powder coating useful in an electrostatic coating process making use of a powder-fluidizing container, a powder coating process for the powder coating and a powder-coated article obtained by using the powder coating.

b) Description of the Related Art

Processes for coating an article with a powder coating conventionally include electrostatic coating processes and fluidized bed coating processes. In an electrostatic coating process, use of a powder coating the average particle size of which is 30 $\mu$m or smaller is generally prone to cohesion of particles of the powder coating, resulting in a baked coating of reduced smoothness due to inclusion of cohered particles. Moreover, the flowability of the powder coating as powder is reduced and an object under coating cannot therefore be coated evenly, leading to the formation of a coating with lowered smoothness. An average particle size greater than 30 $\mu$m, on the other hand provides a coating of reduced cohesion tendency but, after baking, results in the formation of large interparticle voids. When coated thinly (about 50 $\mu$m or less), a coating is obtained with reduced smoothness after baking.

A fluidized-bed coating process, the other coating process, uses a powder coating, particles of which are generally coarser than those employed in an electrostatic coating process so that a coating lower in smoothness than that available by the electrostatic coating process is obtained after baking.

With a view to providing a coating with improved smoothness by relying upon a coating process, a great deal of research has been conducted in recent years on electrostatic fluidized-bed coating processes, resulting in the proposal of such a process as illustrated in FIG. 1.

The process illustrated in FIG. 1 is a powder coating process. Described specifically, a powder coating 2 which has been pneumatically brought into a fluidized state in a powder-fluidizing container 1 is lifted toward an object 4, which is to be coated and is suspended from a ground electrode 7, while applying positive (or negative) charges thereto from a powder-feeding lower electrode 3. Opposite, namely, negative (or positive) charges are next applied from a powder-feeding upper electrode 5, whereby the powder coating is lifted further while its charges are being neutralized. A pair or plural pairs of side electrodes 6 are arranged above the powder-feeding upper electrode 5 so that the object 4 suspended from the ground electrode 7 is conveyed between the paired side electrodes 6 in parallel with the paired side electrodes 6. Negative (or positive) charges are then applied from the pair or plural pairs of side electrodes 6, whereby powder coating is applied to a surface of the object passing between the side electrodes 6.

According to this process, the powder coating 2 is fluidized in the powder-fluidizing container 1. Charges are applied to the cohered powder coating 2 from the lower electrode 3. Individual particles of the powder coating are hence charged so that they repel each other. The cohered particles are therefore lifted while separating from each other. They are lifted further while their charges are once neutralized by the upper electrode 5. Subsequently, charges are applied from the side electrodes 6 so that the powder coating is applied.

The above-described electrostatic coating process making use of the powder-fluidizing container (electrostatic fluidized-bed coating process) has an excellent advantage that a thinner coating can be formed compared with conventional power coating processes. This process is however accompanied by a problem that powder coatings of different colors or different resins have to be prepared in advance, in other words, an extremely wide variety of powder coatings have to be prepared beforehand because only one kind of powder coating is used upon each application.

SUMMARY OF THE INVENTION

An object of the present invention is therefore to provide a powder coating which permits formation of a coating of a desired color tone, especially a coating excellent in artistry by an electrostatic fluidized-bed coating process making use of a powder-fluidizing container. Another object of the present invention is to provide a powder coating process for the powder coating. A further object of the present invention is to provide a powder-coated article obtained by using the powder coating.

In one aspect of the present invention, there is thus provided a powder coating for coating an article by an electrostatic coating process making use of a powder-fluidizing container. The powder coating has a volume resistance of from $10^{10}$ to $10^{17}$ $\Omega$cm and, when pneumatically brought into a fluidized state, the powder coating comprises powder coating particles having an average particle size of from 5 to 500 $\mu$m.

In another aspect of the present invention, there is also provided a powder coating process for coating an article, which is an object to be coated, with the above-described powder coating by an electrostatic coating process making use of a powder-fluidizing container.

In a further aspect of the present invention, there is also provided a powder-coated article coated by the above-described process.

According to the present invention, powder coatings of hues as base colors (for example, yellow, red, blue, black and white) are prepared in advance. Further, with respect to each of these base color powder coatings, powder coatings of various particles sizes are also prepared beforehand. For example, with respect to each of the powder coatings of the above-described five colors, plural powder coatings different in particle size (for example, 5 types of particle sizes) are prepared in advance. They are used as base colors (for example, 5 colors×5 types of particle sizes=25 base colors of different kinds). This makes it possible to readily provide a powder coating of required hue and tone by mixing two or more of these different powder coatings together. Further, a coating of a required thickness can be easily formed by selecting one of the powder coatings, the particle size of which one powder coating is appropriate.

Moreover, mixed use of powder coatings of different particles sizes can form various coatings having excellent artistry.

In addition, the determination of such bases colors makes it unnecessary to produce a powder coating of required hue and tone upon each application. This makes it possible to reduce the kinds of powder coatings which have to be stocked, so that a power coating manufacturer can systematically produce powder coatings in large quantities. This can therefore achieve rationalization in production, storage, physical distribution, management and the like and also a cost reduction in each of these stages.

DETAILED DESCRIPTION OF THE INVENTION AND PREFERRED EMBODIMENT

Figure 1:
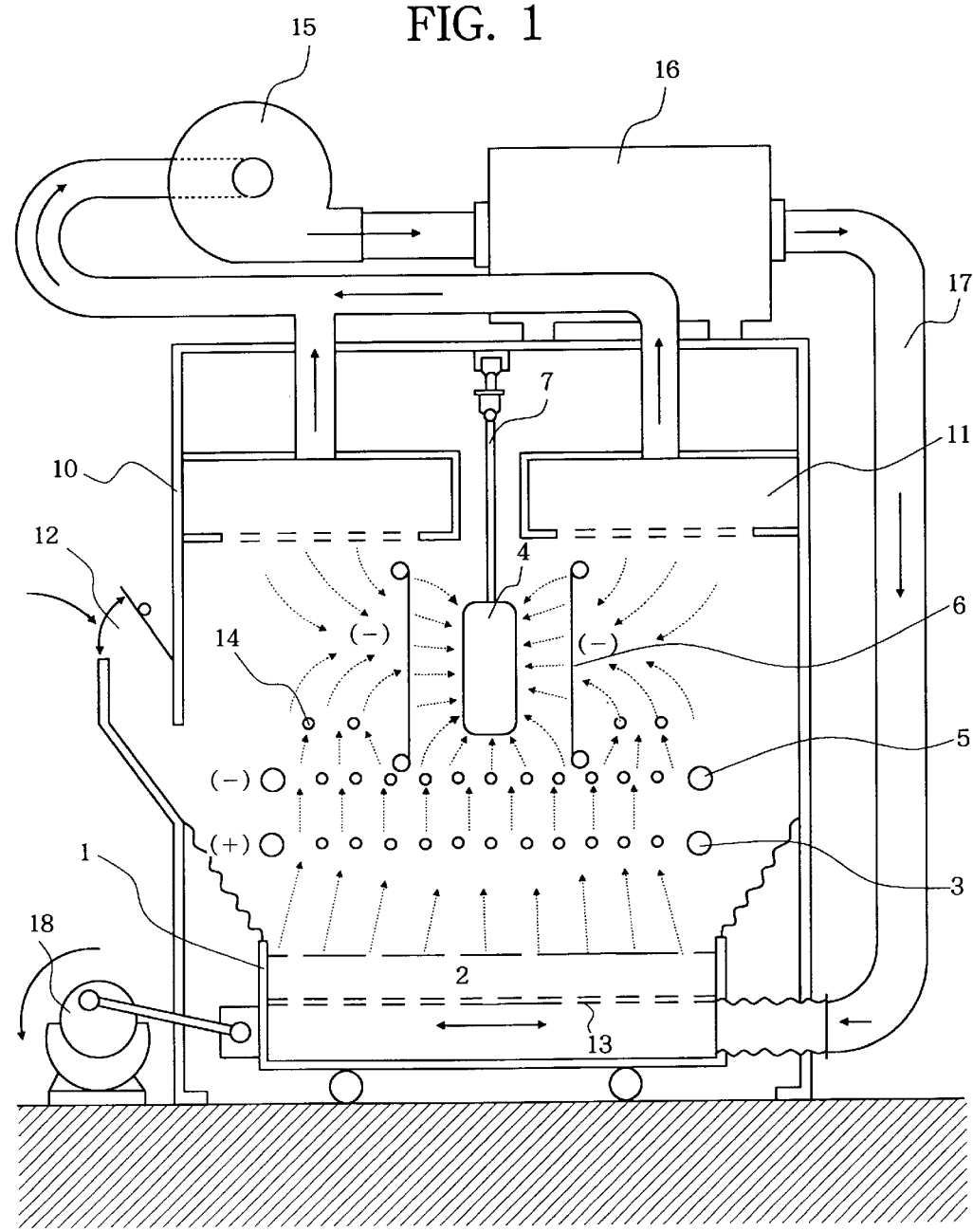
FIG. 1 schematically illustrates an electrostatic fluidized-bed coating apparatus suitable for use in the practice of the powder coating process according to the present invention.

The powder coating is suited for use in such an electrostatic fluidized-bed coating process as shown in FIG. 1. The electrostatic fluidized-bed coating apparatus depicted in FIG. 1 is constructed of a powder tank 10 having doors in left-hand and right-hand side walls thereof, respectively. A powder-fluidizing container 1 arranged in a lower part of the powder tank 10, while an upper filter 11 is disposed in an upper part of the powder tank 10. It is to be noted that FIG. 1 shows only the door, which is arranged in the left-hand wall, as a powder supply door 12.

The powder-fluidizing container 1 blows air upwards through a filter (porous plate) 13 while vibrating a powder coating 2, so that the powder coating 2 is fluidized. Above the filter 13, two types of electrodes 3,5 of different polarities are arranged. The powder-feeding lower electrode 3 lifts the powder coating 2, which has been brought into a fluidized state, while applying charges thereto. Next, opposite charges are applied from the powder-feeding upper electrode 5 so that the powder coating 2 is lifted further while being neutralized. Unneutralized charges can be neutralized by a neutralizing ground electrode 14 as needed.

A pair or plural pairs of side electrodes 6 are arranged in parallel with an object 4, which is to be coated, within the thus-formed fluidized atmosphere of the powder coating. Charges are applied to the powder coating 2 from the side electrodes 6, whereby the powder coating 2 is caused to deposit on the object 4 while the object 4 is being conveyed between the side electrodes 6. The thus-coated object is then subjected to baking so that a coating is formed. During these processing, air is recirculated by a blower 15 through an upper filter 11. By a humidifier 16 controlled, for example, at a relative humidity of from 60 to 70%, the air is adequately humidified to stabilize the volume resistance of the powder coating. The thus-humidified air then flows through an air feed pipe 17, reaches a space underneath a porous plate 13 in the fluidizing container 1, and then fluidizes the powder coating. Incidentally, the fluidizing container 1 is horizontally reciprocated by a shaking device 18 to promote the fluidization of the powder coating 2.

According to the present invention, the limitation of the volume resistance of the particles of the employed powder coating to the range of $10^{10}$ to $10^{17}$ $\Omega$cm in the static fluidized-bed coating process has made it possible to provide a coating of desired physical properties, such as a matte coating or an uneven coating, by mixing two or more powder coatings of different resins (for example, a combination of an epoxy resin and a polyester resin, or the like), to say nothing of two or more powder coatings of the same resin.

Further, combined use of powder coatings of different particle sizes, for example, combined use of a powder coating having an average particle size of from 5 to 30 $\mu$m and another powder coating having an average particle size of from 300 to 500 $\mu$m makes it possible to form a decorative coating having a desired spot pattern in addition to the above-described physical properties and equipped with excellent artistry provided that the powder coatings are different in hue, lightness and/or saturation.

When a thin coating is required, use of a powder coating having an average particle size of from 5 to 20 $\mu$m can form a thin coating with excellent surface smoothness and luster.

Further, when powder coatings of such small average particle sizes are used, powder coatings of desired tones can each be readily prepared by mixing powder coatings of different hues. If the formulas of powder coatings of gray and beige colors, which are widely used as powder coatings, are determined and are recorded as base color formulas, powder coatings of tones designated by a user can be easily formulated and prepared by subjecting the designated tones to color separation with a computer and slightly changing the formulas of the powder coatings, which make up the base colors and are different in hues, even if the designated tones are slightly different from the corresponding base colors and vary substantially from one user to another.

As a method for conducting color separation on tones designated by a user, it is suited to use computerized color matching (hereinafter called "CCM"), for example, "COLORCOM System" or "COLORCOM Compact System" (both, trade names and available from Dainichiseika Color & Chemicals Mfg. Co., Ltd.) although a mixed color chart may be prepared. A powder coating of each designated color can be easily prepared by using one of the "COLORCOM" systems or the like, namely, by recording the powder formulas of base colors, measuring the designated tone (color specimen) with a spectrophotometer to display the designated tone and then adjusting the mixing ratio of two or more of the base colors in accordance with the thus-displayed designated tone.

According to the present invention, it is also possible to freely adjust the thickness of a coating to be formed. Described specifically, when formation of a thin coating of 5 to 30 $\mu$m in average thickness is required, it is only necessary to use one or more powder coatings having average particle sizes of from 5 to 30 $\mu$m. When a coating having an intermediate thickness of from 30 to 100 $\mu$m in average thickness is required, it is only necessary to use one or more powder coatings having average particle sizes of from 30 to 100 $\mu$m. When a thick coating of from 100 to 500 $\mu$m in average thickness is required, it is only necessary to use one or more powder coatings having average particle sizes of from 100 to 500 $\mu$m.

The components and preparation process of each of the above-described powder coatings according to the present invention can be the same as those known to date in the present field of art.

For example, each powder coating according to the present invention is basically composed of a binder resin and a hardening agent. Illustrative of the binder resin are epoxy resins, acrylic resins, phenol resins, xylene resins, urea resins, melamine resins, and polyester resins. Examples of the hardening agent can include polyisocyanates, amines, polyamides, acid anhydrides, polysulfides, trifluoroboric acid, acid dihydrazides, and imidazoles. Further, the powder coating can be added with a filler such as barium sulfate, calcium carbonate, aluminum sulfate or calcium silicate; a leveling agent such as an acrylic oligomer or a silicone; a coloring matter such as titanium oxide, chromium oxide, iron oxide, carbon black, or one or more of various organic pigments; an anti-foaming agent; and/or the like.

To prepare the powder coating formed of the above-described components, the individual components are fully mixed in the form of powders and then thoroughly kneaded at a temperature where the resin component is not hardened, for example, at a temperature of from 110° to 130° C. in a kneader, an extruder or the like. After the kneading, the resultant mass is cooled and then ground and classified in a grinder such as a jet mill, whereby the powder coating according to the present invention is obtained. Objects which may be coated with the powder coatings according to the present invention can include, for example, automotive vehicles, bodies of electrical appliances, mechanical parts, construction materials, and the like.

It is preferred to incorporate additives such as hydrophobic silica, titanium oxide, alumina, polyvinyl fluoride, metallic soaps and nonionic surfactants during or after the above-described operation. These additives can improve the flowability of the powder coating as a powder and hence the coating work.

In the present invention, the volume resistance of particles of the powder coating is controlled to the range of from $10^{10}$ to $10^{17}$ Ωcm, preferably to a range of from $10^{11}$ to $10^{15}$ Ωcm. If the volume resistance of the particles is lower than $10^{10}$ Ωcm, the objects of the present invention can be hardly achieved, resulting in the development of a problem such that the powder coating may not be coated in close contact with the object. On the other hand, a volume resistance of the particles higher than $10^{17}$ Ωcm is not desired in that static electricity of the coating applied on the object cannot be drained easily through the ground electrode and thick coating is thus infeasible.

Control of the volume resistance of particles of each powder coating is conducted by adding an antistatic agent (a cationic surfactant, a nonionic surfactant, an ester compound, or the like) or a metal powder (aluminum powder or the like). The volume resistance was measured by an "ULTRA HIGH RESISTANCE METER" (manufactured by ADVANTEST Corporation).

The present invention will hereinafter be described more specifically in the following examples, in which all designations of "part" or parts" or "%" are by weight unless otherwise specifically indicated.

EXAMPLE 1

| Formula 1-A | |
|---|---|
| "FINE DIC M-8020" (trade name for a polyester resin produced by Dainippon Ink & Chemicals, Incorporated) | 100 parts |
| "Crelan U" [trade name for a hardener (blocked isocyanate) produced by Bayer AG] | 18.3 parts |
| "Epiclon 4050" (trade name for an epoxy resin produced by Dainippon Ink & Chemicals, Incorporated) | 3.7 parts |
| "Acronal 4F" [trade name for a flow control agent (polyacrylic ester) produced by BASF AG] | 0.6 part |
| Benzoin (product of Wako Pure Chemical Industries, Ltd.) | 0.6 part |
| "Tipaque CR-50" (trade name for a titanium oxide white pigment produced by Ishihara Sangyo Kaisha, Ltd.) | 82 parts |
| D.B.T.D.L. (di-n-butyltin dilaurate) | 0.24 part |
| Formula 1-B | |
| "FINE DIC M-8020" | 100 parts |
| "Crelan U" [trade name for a hardener (blocked isocyanate) produced by Bayer AG)] | 18.3 parts |

-continued

| | |
|---|---|
| "Epiclon 4050" | 3.7 parts |
| "Acronal 4F" | 0.6 part |
| Benzoin | 0.6 part |
| "Tipaque CR-50" | 82 parts |
| D.B.T.D.L. | 0.24 part |
| "Carbon MA-100" [trade name for a black pigment (carbon) produced by Mitsubishi Chemical Corporation] | 1 part |

The formulations of the above formulas 1-A and 1-B were individually kneaded in a "Ko-Kneader PR-46" (manufactured by Buss Ltd.) and, subsequent to grinding, were individually classified through a 120-mesh sieve to obtain powder coatings of 35 μm in average particle size. The volume resistances of these powder coatings were $3\times10^{15}$ Ωcm (1-A) and $1\times10^{15}$ Ωcm (1-B), respectively.

Employing the powder coatings (1-A) and (1-B) separately, coating was then conducted using the electrostatic fluidized-bed coating apparatus shown in FIG. 1 and bright-dipped steel plates as objects to be coated. The thus-coated plates were subjected to hardening at 180° C. for 20 minutes to form coatings of from 30 to 100 μm, whereby coatings excellent in smoothness and free of pinholes or craters were obtained.

Further, a mixture of the powder coatings (1-A) and (1-B) was coated using the electrostatic fluidized-bed coating apparatus shown in FIG. 1 and a bright-dipped steel plate as an object to be coated. The thus-coated plate was subjected to hardening at 180° C. for 20 minutes to form a coating of from 30 to 100 μm, whereby a coating excellent in smoothness and free of pinholes or craters were obtained. Its hue was the middle between those of both powder coatings.

EXAMPLE 2

| Formula 2-A | |
|---|---|
| "FINE DIC M-8520" (trade name for a polyester resin produced by Dainippon Ink & Chemicals, Incorporated) | 100 parts |
| "Epiclon 3050" (trade name for an epoxy resin produced by Dainippon Ink & Chemicals, Incorporated) | 100 parts |
| "Acronal 4F" | 2 parts |
| "Curezole C17Z" [trade name for a hardener (a derivative of imidazole) produced by Shikoku Chemicals Corp.] | 0.3 part |
| Benzoin | 0.6 part |
| "Tipaque CR-50" | 100 parts |
| Formula 2-B | |
| "FINE DIC M-8520" | 100 parts |
| "Epiclon 3050" | 100 parts |
| "Acronal 4F" | 2 part |
| "Curezole C17Z" | 0.3 part |
| Benzoin | 0.6 part |
| "Tipaque CR-50" | 100 parts |
| "Carbon MA-100" | 1 part |

The formulations of the above formulas 2-A and 2-B were individually kneaded in the "Ko-Kneader PR-46" (manufactured by Buss Ltd.) and, subsequent to grinding, were individually classified through a 120-mesh sieve. The volume resistances of these powder coatings were $2\times10^{15}$ Ωcm (2-A) and $1\times10^{15}$ Ωcm (2-B), respectively.

Employing the powder coatings (2-A) and (2-B) separately, coating was then conducted using the electrostatic fluidized-bed coating apparatus shown in FIG. 1 and tin plates as objects to be coated. The thus-coated plates were subjected to hardening at 180° C. for 20 minutes to form coatings of from 30 to 100 μm, whereby coatings excellent in smoothness and free of pinholes or craters were obtained.

Further, a mixture of the powder coatings (2-A) and (2-B) was coated using the electrostatic fluidized-bed coating apparatus shown in FIG. 1 and a tin plate as an object to be coated. The thus-coated plate was subjected to hardening at 180° C. for 20 minutes to form a coating of from 30 to 100 μm, whereby a coating excellent in smoothness and free of pinholes or craters were obtained. Its hue was the middle between those of both powder coatings.

EXAMPLE 3

| Formula 3-A | |
|---|---|
| "FINE DIC M-8520" | 100 parts |
| "Epiclon 3050" | 100 parts |
| "Acronal 4F" | 2 part |
| "Curezole C17Z" | 0.3 part |
| Benzoin | 0.6 part |
| "Aluminum Paste 710N" (trade name; product of Showa Aluminum Powder K.K.) | 30 parts |
| Formula 3-B | |
| "FINE DIC M-8520" | 100 parts |
| "Epiclon 3050" | 100 parts |
| "Acronal 4F" | 2 part |
| "Curezole C17Z" | 0.3 part |
| Benzoin | 0.6 part |
| "Iliodin Satin White" (trade name for a synthetic pearl white luster pigment produced by Merck & Co., Inc.) | 25 parts |

The formulations of the above formulas 3-A and 3-B were individually kneaded in the "Ko-Kneader PR-46" (manufactured by Buss Ltd.) and, subsequent to grinding, were individually classified through a 120-mesh sieve. The volume resistances of these powder coatings were $1 \times 10^{14}$ Ωcm (3-A) and $1 \times 10^{15}$ Ωcm (3-B), respectively.

Employing the powder coatings (3-A) and (3-B) separately, coating was then conducted using the electrostatic fluidized-bed coating apparatus shown in FIG. 1 and bright-dipped steel plates as objects to be coated. The thus-coated plates were subjected to hardening at 180° C. for 20 minutes to form coatings of from 30 to 100 μm, whereby coatings excellent in smoothness and free of pinholes or craters were obtained.

Further, a mixture of the powder coatings (3-A) and (3-B) was coated using the electrostatic fluidized-bed coating apparatus shown in FIG. 1 and a bright-dipped steel plate as an object to be coated. The thus-coated plate was subjected to hardening at 180° C. for 20 minutes to form a coating of from 30 to 100 μm, whereby a coating excellent in smoothness and free of pinholes or craters were obtained. Its hue was the middle between those of both powder coatings.

EXAMPLE 4

| Formula 4-A | |
|---|---|
| "Almatex PD-6100"(trade name for an acrylic resin produced by Mitsui-Toatsu Chemicals, Inc.) | 100 parts |
| 1,12-Dodecanedioic acid (product of E.I. du Pont de Nemours & Co., Inc.) | 11 parts |
| "Epicoat 1002" (trade name for an epoxy resin produced by Shell Chemicals NV) | 5.8 parts |
| "Acronal 4F" | 1.5 part |
| "Tipaque CR-50" | 30 parts |
| Formula 4-B | |
| "Almatex PD-6100" | 100 parts |
| 1,12-Dodecanedioic acid | 11 parts |
| "Epicoat 1002" | 5.8 parts |
| "Acronal 4F" | 1.5 part |
| "Tipaque CR-50" | 20 parts |
| "Tipaque Yellow TY-70" (trade name; product of Ishihara Sangyo Kaisha, Ltd.) | 10 parts |

The formulations of the above formulas 4-A and 4-B were individually kneaded in the "Ko-Kneader PR-46" (manufactured by Buss Ltd.) and, subsequent to grinding, were individually classified through a 150-mesh sieve. The volume resistances of these powder coatings were $2 \times 10^{13}$ Ωcm (4-A) and $1 \times 10^{13}$ Ωcm (4-B), respectively.

Employing the powder coatings (4-A) and (4-B) separately, coating was then conducted using the electrostatic fluidized-bed coating apparatus shown in FIG. 1 and bright-dipped steel plates as objects to be coated. The thus-coated plates were subjected to hardening at 180° C. for 20 minutes to form coatings of from 100 to 500 μm, whereby coatings excellent in smoothness and free of pinholes or craters were obtained.

Further, a mixture of the powder coatings (4-A) and (4-B) was coated using the electrostatic fluidized-bed coating apparatus shown in FIG. 1 and a bright-dipped steel plate as an object to be coated. The thus-coated plate was subjected to hardening at 180° C. for 20 minutes to form a coating of from 100 to 500 μm, whereby a coating excellent in smoothness and free of pinholes or craters were obtained. Its hue was the middle between those of both powder coatings.

EXAMPLE 5

| Formula 5-A | |
|---|---|
| "Araldite AER-6054" (trade name for an epoxy resin produced by Asahi-CIBA Limited) | 100 parts |
| "AER Hardener D-210" (trade name for a dicyandiamide derivative produced by Monsanto Chemical Company) | 5 parts |
| "Modaflow" [trade name for a flow control agent (polyacrylic ester) produced by Monsanto Chemical Company) | 0.3 part |
| "Tipaque CR-50" | 30 parts |
| Formula 5-B | |
| "Araldite AER-6054" | 100 parts |
| "AER Hardener D-210" | 5 parts |
| "Modaflow" | 0.3 part |
| "Tipaque CR-50" | 20 parts |
| "Tipaque Yellow TY-70" | 10 parts |

The formulations of the above formulas 5-A and 5-B were individually kneaded in the "Ko-Kneader PR-46" (manufactured by Buss Ltd.) and, subsequent to grinding, were individually classified through a 150-mesh sieve. The volume resistances of these powder coatings were $3\times10^{15}$ Ωcm (5-A) and $1\times10^{15}$ Ωcm (5-B), respectively.

Employing the powder coatings (5-A) and (5-B) separately, coating was then conducted using the electrostatic fluidized-bed coating apparatus shown in FIG. 1 and bright-dipped steel plates as objects to be coated. The thus-coated plates were subjected to hardening at 180° C. for 20 minutes to form coatings of from 30 to 100 μm, whereby coatings excellent in smoothness and free of pinholes or craters were obtained.

Further, a mixture of the powder coatings (5-A) and (5-B) was coated using the electrostatic fluidized-bed coating apparatus shown in FIG. 1 and a bright-dipped steel plate as an object to be coated. The thus-coated plate was subjected to hardening at 180° C. for 20 minutes to form a coating of from 30 to 100 μm, whereby a coating excellent in smoothness and free of pinholes or craters were obtained. Its hue was the middle between those of both powder coatings.

EXAMPLE 6

The formulations of the above formulas 5-A and 5-B were individually kneaded in the "Ko-Kneader PR-46" (manufactured by Buss Ltd.) and, subsequent to grinding, were individually classified through a 150-mesh sieve, whereby powder coatings of about 35 μm in average particle size were obtained.

Employing a mixture of the powder coatings (5-A) and (5-B), coating was then conducted using the electrostatic fluidized-bed coating apparatus shown in FIG. 1 and a bright-dipped steel plate as an object to be coated. The thus-coated plate was subjected to hardening at 180° C. for 20 minutes to form a coating of from 30 to 100 μm, whereby a coating excellent in smoothness and free of pinholes or craters were obtained. Its hue was the middle between those of both powder coatings.

EXAMPLE 7

The formulations of the above formulas 5-A and 5-B were individually kneaded in the "Ko-Kneader PR-46" (manufactured by Buss Ltd.) and, subsequent to grinding, were individually classified through a 150-mesh sieve, whereby powder coatings of about 35 μm in average particle size were obtained. They were separately ground further in a mill so that powder coatings of about 10 μm in average particle size were obtained. Employing a mixture of the thus-milled powder coatings (5-A) and (5-B), coating was then conducted using the electrostatic fluidized-bed coating apparatus shown in FIG. 1 and a bright-dipped steel plate as an object to be coated. The thus-coated plate was subjected to hardening at 180° C. for 20 minutes to form a coating of from 5 to 30 μm, whereby a coating excellent in smoothness and free of pinholes or craters were obtained. Its hue was the middle between those of both powder coatings.

EXAMPLE 8

Employing a mixture of the powder coating (5-A) of 35 μm in average particle size obtained in Example 6 and the powder coating (5-B) of 10 μm in average particle size obtained in Example 7, coating was conducted using the electrostatic fluidized-bed coating apparatus shown in FIG. 1 and a bright-dipped steel plate as an object to be coated. The thus-coated plate was subjected to hardening at 180° C. for 20 minutes to form a coating of from 5 to 30 μm, whereby a coating excellent in smoothness and free of pinholes or craters were obtained. Its hue was the middle between those of both powder coatings.

EXAMPLE 9

| Formula 6-A | |
| --- | --- |
| "Araldite AER-6054" | 100 parts |
| "AER Hardener D-210" | 5 parts |
| "Modaflow" | 0.3 part |
| "Tipaque CR-50" | 20 parts |
| "Cyanine Blue 4920" (trade name; product of Dainichiseika Color & Chemicals Mfg. Co., Ltd.) | 1 part |
| Formula 6-B | |
| "Araldite AER-6054" | 100 parts |
| "AER Hardener D-210" | 5 parts |
| "Modaflow" | 0.3 part |
| "Tipaque CR-50" | 20 parts |
| "Cinquacia Red B RT-796-D" (trade name; product of E.I. du Pont de Nemours & Co., Inc.) | 1 part |
| Formula 6-C | |
| "Araldite AER-6054" | 100 parts |
| "AER Hardener D-210" | 5 parts |
| "Modaflow" | 0.8 part |
| "Carban MA-100" | 1 part |

The formulations of the above formulas 6-A, 6-B and 6-C were individually kneaded in the "Ko-Kneader PR-46" (manufactured by Buss Ltd.) and, subsequent to grinding, were individually classified through a 150-mesh sieve, whereby powder coatings of about 35 μm in average particle size were obtained. The volume resistances of these powder coatings were $4\times10^{15}$ Ωcm (6-A), $3\times10^{15}$ Ωcm (6-B) and $3\times10^{15}$ Ωcm (6-C), respectively.

Employing a mixture of these powder coatings, coating was conducted using the electrostatic fluidized-bed coating apparatus shown in FIG. 1 and a dull-finished steel plate as an object to be coated. The thus-coated plate was subjected to hardening at 180° C. for 20 minutes to form a coating of from 30 to 100 μm, whereby a coating excellent in smoothness and free of pinholes or craters were obtained. A desired hue was obtained by changing the mixing ratio of the three powder coatings.

The three formulations of the above formulas 6-A, 6-B and 6-C were individually ground in the mill, whereby powder coatings of about 10 μm in average particle size were obtained.

Employing a mixture of the thus-milled powder coatings, coating was conducted using the electrostatic fluidized-bed coating apparatus shown in FIG. 1 and a dull-finished steel plate as an object to be coated. The thus-coated plate was subjected to hardening at 180° C. for 20 minutes to form a coating of from 5 to 30 μm, whereby a coating excellent in smoothness and free of pinholes or craters were obtained. A desired hue was obtained by changing the mixing ratio of the three milled powder coatings.

EXAMPLE 10

Employing a mixture of the formulation (4-A) obtained in Example 4 and the formulation (5-A) obtained in Example 5, coating was conducted using the electrostatic fluidized-bed coating apparatus shown in FIG. 1 and a dull-finished steel plate as an object to be coated. The thus-coated plate was subjected to hardening at 180° C. for 20 minutes to form a coating of from 30 to 100 μm, thereby obtaining an artistic coating which had an excellent rugged pattern, was free of pinholes and had a white color.

EXAMPLE 11

Formula 7-A

| | |
|---|---|
| "FINE DIC M-8020" | 100 parts |
| "Crelan UI" | 18.3 parts |
| "Epiclon 4050" | 3.7 parts |
| "Acronal 4F" | 0.6 part |
| Benzoin | 0.6 part |
| "Tipaque CR-50" | 66 parts |
| D.B.T.D.L. | 0.24 part |

Formula 7-B

| | |
|---|---|
| "FINE DIC M-8020" | 100 parts |
| "Crelan UI" | 18.3 parts |
| "Epiclon 4050" | 3.7 parts |
| "Acronal 4F" | 0.6 part |
| Benzoin | 0.6 part |
| "Tipaque CR-50" | 66 parts |
| D.B.T.D.L. | 0.24 part |
| "Carbon MA-100" | 0.066 part |

Formula 7-C

| | |
|---|---|
| "FINE DIC M-8020" | 100 parts |
| "Crelan UI" | 18.3 parts |
| "Epiclon 4050" | 3.7 parts |
| "Acronal 4F" | 0.6 part |
| Benzoin | 0.6 part |
| "Tipaque CR-50" | 66 parts |
| D.B.T.D.L. | 0.24 part |
| "Carbon MA-100" | 0.066 part |
| "Cyanine Blue 4920" | 0.099 part |

The formulations of the above formulas 7-A, 7-B and 7-C were individually kneaded in the "Ko-Kneader PR-46" (manufactured by Buss Ltd.) and, subsequent to grinding, were individually classified through a 150-mesh sieve, whereby powder coatings of about 35 μm in average particle size were obtained. The volume resistances of these powder coatings were $3 \times 10^{15}$ Ωcm (7-A), $2 \times 10^{15}$ Ωcm (7-B) and $2 \times 10^{15}$ Ωcm (7-C), respectively.

These powder coatings were finely ground in the mill, whereby milled powder coatings (7-A,7-B,7-C) of about 10 μm in average particles size were obtained. The thus-obtained milled powder coatings were separately coated using the electrostatic fluidized-bed coating apparatus shown in FIG. 1 and bright-dipped steel plates as objects to be coated. The thus-coated plates were subjected to hardening at 180° C. for 20 minutes, thereby obtaining white, light gray and bluish gray coatings which were 20 to 30 μm in thickness, were excellent in smoothness and were free of pinholes or craters.

To employ the milled powder coatings (7-A,7-B, 7-C) as base colors for color matching, the coated steel plates were individually measured by the CCM "COLORCOM System" to input their tones. A color specimen was set, and by using the "COLORCOM System", it was measured, followed by calculation. In accordance with a displayed mixing ratio, the milled powder coatings (7-A,7-B,7-C) were mixed. By the procedures of Example 1, a bright-dipped steel plate was coated with the resulting mixture and the thus-coated plate was subjected to hardening at 180° C. for 20 minutes, thereby obtaining a coating which was 20 to 30 μm in thickness, was excellent in smoothness, was free of pinholes or craters and was of a uniform mixed color. The tone of the thus-coated steel plate was measured by the "COLORCOM System". The results of the measurement were not much different compared with ΔL*, Δa, Δb* and ΔE estimated by calculation from the individual measurement data of the color specimen and the milled powder coatings (7-A,7-B, 7-C).

EXAMPLE 12

Formula 8-A

| | |
|---|---|
| "FINE DIC M-8020" | 100 parts |
| "Crelan UI" | 18.3 parts |
| "Epiclon 4050" | 3.7 parts |
| "Acronal 4F" | 0.6 part |
| Benzoin | 0.6 part |
| "Tipaque CR-50" | 66 parts |
| D.B.T.D.L. | 0.24 part |
| "Carbon MA-100" | 0.066 part |
| "TAROX HY-250" (trade name; product of Titan Kogyo K.K.) | 0.66 part |

The formulation of the formula 8-A was kneaded in the "Ko-Kneader PR-46" (manufactured by Buss Ltd.) and, subsequent to grinding, was classified through a 150-mesh sieve, whereby a powder coating of about 35 μm in average particle size was obtained. The volume resistances of this powder coating was $2 \times 10^{15}$ Ωcm.

The powder coating was finely ground in the mill, whereby a milled powder coating of about 10 μm in average particles size was obtained. The thus-obtained milled powder coating (8-A) was coated using the electrostatic fluidized-bed coating apparatus shown in FIG. 1 and a bright-dipped steel plate as an object to be coated. The thus-coated plate was subjected to hardening at 180° C. for 20 minutes, thereby obtaining a beige coating which was 20 to 30 μm in thickness, was excellent in smoothness and was free of pinholes or craters.

In a similar manner as in Example 11, the milled powder coatings (7-A,7-B,8-A) were measured by the "COLORCOM system" and their tones were inputted to use them as base colors. A color matching test was conducted following the procedures of Example 1. Namely, desired mixtures of the milled powder coatings (7-A, 7-B,8-A) were separately coated on bright-dipped steel plates and the thus-coated plates were subjected to hardening at 180° C. for 20 minutes, thereby obtaining coatings which were 20 to 30 μm in thickness, were excellent in smoothness, were free of pinholes or craters and were of uniform mixed colors.

The results of measurements of the tones of these coated steel plates by the "COLORCOM system" were not much different compared with ΔL*, Δa, Δb* and ΔE estimated by calculation from the individual measurement data of the milled powder coatings (7-A,7-B,8-A).

EXAMPLE 13

Formula 9-A

| | |
|---|---|
| "FINE DIC M-8020" | 100 parts |
| "Crelan UI" | 18.3 parts |
| "Epiclon 4050" | 3.7 parts |
| "Acronal 4F" | 0.6 part |
| Benzoin | 0.6 part |
| "Tipaque CR-50" | 66 parts |
| D.B.T.D.L. | 0.24 part |
| "Carbon MA-100" | 0.066 part |
| "Cinquacia Red B RT-796-D" | 0.10 part |

The formulation of the formula 9-A was kneaded in the "Ko-Kneader PR-46" (manufactured by Buss Ltd.) and, subsequent to grinding, was classified through a 150-mesh sieve, whereby a powder coating of about 35 μm in average particle size was obtained. The volume resistances of this powder coating was $1\times10^{15}$ Ωcm.

The powder coating was finely ground in the mill, whereby a milled powder coating of about 10 μm in average particles size was obtained. The thus-obtained milled powder coating (9-A) was coated using the electrostatic fluidized-bed coating apparatus shown in FIG. 1 and a bright-dipped steel plate as an object to be coated. The thus-coated plate was subjected to hardening at 180° C. for 20 minutes, thereby obtaining a reddish gray coating which was 20 to 30 μm in thickness, was excellent in smoothness and was free of pinholes or craters.

In a similar manner as in Example 11, the steel plates coated with the milled powder coatings (7-A,7-B, 9-A), respectively, were individually measured by the "COLOR-COM system" to input their tones so that the milled powder coatings can be employed as base colors. Using the "COLORCOM system", color specimens were measured, followed by calculation. In accordance with displayed mixing ratios, the milled powder coatings (7-A,7-B,9-A) were mixed. By the procedures of Example 1, bright-dipped steel plates were coated with the resulting mixtures, respectively, and the thus-coated plates were subjected to hardening at 180° C. for 20 minutes, thereby obtaining coatings which were 20 to 30 μm in thickness, were excellent in smoothness, were free of pinholes or craters and were of uniform mixed colors. The results of measurements of the tones of these coated steel plates by the "COLORCOM system" were not much different compared with ΔL*, Δa, Δb* and ΔE estimated by calculation from the individual measurement data of the color specimen and the milled powder coatings (7-A,7-B,9-A).

According to the present invention as described above, color matching is feasible upon powder coating by preparing two or more colored powder coatings different in hue, lightness and/or saturation as base colors in advance and mixing two or more of the base color powder coatings in accordance with a desired color. Accordingly, powder coatings to be stocked can be reduced in number and can be systematically produced in large quantities. This can achieve rationalization in production, storage, physical distribution, management and the like and also a cost reduction in each of these stages. For example, coatings of desired color tones, especially coatings excellent in artistry can be formed in accordance with a fluidized-bed, electrostatic coating process making use of a powder-fluidizing container by preparing in advance only three primary colors of yellow, red and blue or optionally five primary colors additionally including black color and white color.

What is claimed is:

1. A process for coating an article with a powder coating by an electrostatic coating process using a powder-fluidizing container, wherein said powder coating is obtained from a powder having a volume resistance from $10^{10}$ to $10^{17}$ Ωcm and, when pneumatically brought into a fluidized state, an average particle size of from 5 to 500 μm, said process comprising lifting said powder, which has been pneumatically brought into a fluidized state in said powder-fluidizing container, toward said object by applying charges of one polarity to particles of said powder from a powder-feeding lower electrode;

lifting said particles of said powder further by applying charges of the opposite polarity to said particles from a powder-feeding upper electrode so that said charges of said one polarity on said particles are neutralized by said charges of the opposite polarity;

applying charges of a polarity to said particles from at least one pair of side electrodes arranged in parallel with and on opposite sides of said object, whereby said particles are caused to deposit on a surface of said object.

2. The process of claim 1, wherein said powder coating is a mixture of at least two powder coatings composed of different resins.

3. The process of claim 1, wherein said powder coating comprises at least two kinds of particles having different particle sizes.

4. The process of claim 1, wherein said powder coating is a mixture of at least two powder coatings different in at least one of hue, lightness and saturation.

5. The process of claim 1, wherein said powder coating particles have an average particle size of from 5 to 30 μm.

6. The process of claim 1, wherein said powder coating particles have an average particle size of from 30 to 100 μm.

7. The process of claim 1, wherein said powder coating particles have an average particle size of from 100 to 500 μm.

8. The process of claim 1, wherein said powder coating is a mixture of at least two of five powder coatings of yellow color, red color, blue color, black color and white color, respectively, and said five powder coatings have average particle sizes in a range of from 5 to 20 μm, respectively.

* * * * *